United States Patent [19]

Clauss

[11] 4,114,478
[45] Sep. 19, 1978

[54] PLANETARY TRANSMISSION MECHANISM

[75] Inventor: Julius Alphonse Clauss, Birmingham, Mich.

[73] Assignee: Borg-Warner Corporation, Chicago, Ill.

[21] Appl. No.: 756,316

[22] Filed: Jan. 3, 1977

[51] Int. Cl.² .................. F16H 57/10; F16H 3/44
[52] U.S. Cl. ........................... 74/781 R; 74/750 R
[58] Field of Search ................... 74/781 R, 750 R

[56] References Cited

U.S. PATENT DOCUMENTS

| | | | |
|---|---|---|---|
| 2,012,377 | 8/1935 | De Normanville | 74/781 R |
| 2,242,519 | 5/1941 | Frank | 74/781 R X |
| 2,332,061 | 10/1943 | Conkle | 74/781 R |
| 2,332,588 | 10/1943 | Moffitt | 74/781 R |
| 2,683,997 | 7/1954 | Forster | 74/781 R |
| 2,747,433 | 5/1956 | Forster | 74/781 R |
| 2,971,395 | 2/1961 | Orr | 74/781 R X |
| 3,631,741 | 1/1972 | Kelbel | 74/781 R |
| 3,978,742 | 9/1976 | Abbott | 74/781 R X |

Primary Examiner—Samuel Scott
Assistant Examiner—Lance W. Chandler
Attorney, Agent, or Firm—Robert L. Zieg

[57] ABSTRACT

A planetary overdrive gear mechanism for an automatic transmission utilizing a double-acting one-way clutch with means to immobilize the cage for the one-way clutch with the rollers in an intermediate position whereby the inner and outer races are free to rotate relative to one another and a brake mechanism for the inner race of the clutch which is integral with the sun gear whereby with the brake applied and the one-way clutch neutralized, an overdrive ratio is established through the mechanism, and with the brake released and the cage control released, a two-way direct drive is established through the mechanism.

5 Claims, 2 Drawing Figures

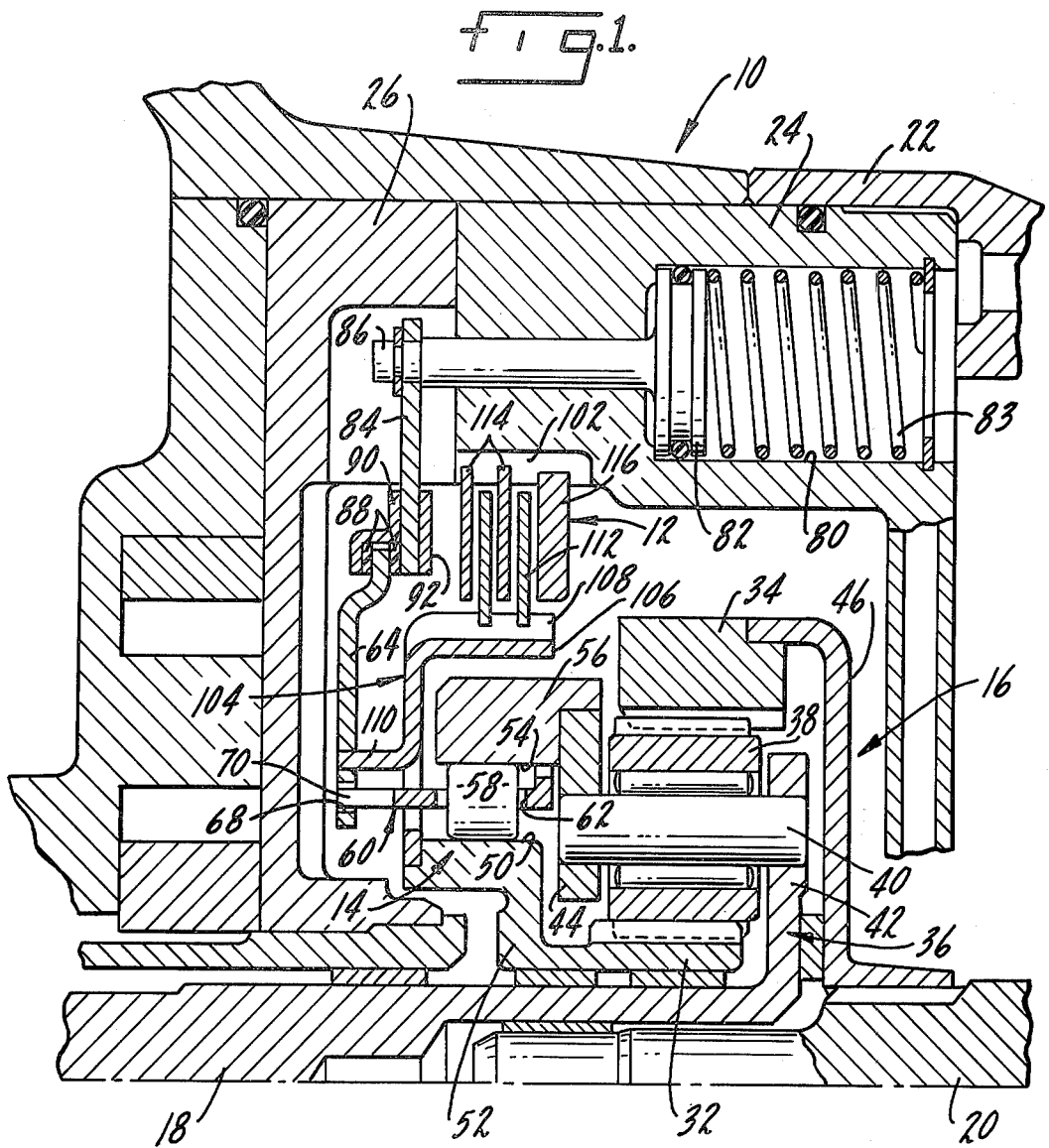
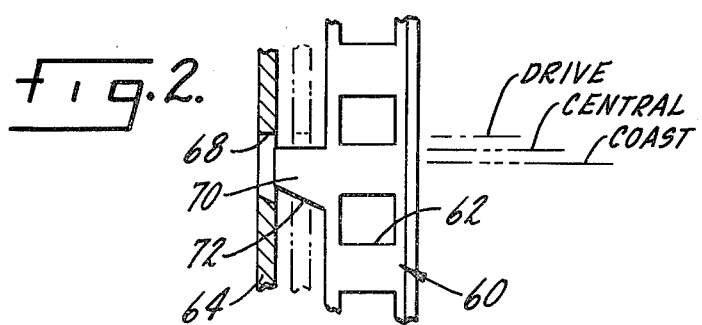

ent application discloses
and claims an improved interlock mechanism to replace
that shown and described for the overdrive gear set of
the previous application. Brake 12 is applied normally
after the third or one-to-one ratio has been established
in the automatic transmission, thus providing a fourth or
top ratio for the automatic transmission. However, it is
also to be understood that brake 12 may be applied to
establish an overdrive ratio through transmission 10
when second ratio is established in the automatic transmission to establish an additional speed ratio between
normal second and third speed ratios. Thus, the overall
ratio provided with brake 12 applied is an overdrive
ratio providing expanded ratio coverage for the transmission. When brake 12 is released, the one-way clutch
14 is activated for operation in either direction, essentially locking up the gear set 16 and allowing for normal
operation of the automatic transmission to provide three
forward speeds and reverse, for example.

PLANETARY TRANSMISSION MECHANISM

BACKGROUND OF THE INVENTION

Various schemes have been developed in the field of automatic transmissions to provide an overdrive ratio. The overdrive ratio is desirable as an additional ratio for the advantages of fuel economy and flexibility in the ratio coverage available. Normal solutions to this problem, as recognized in the prior art, include overdrive gear sets added in series to the transmission structure which adds greatly to the space requirements, not only in the axial sense but also in the radial sense as compared to the transmission without the overdrive ratio. In addition, many of the prior art designs require the utilization of a friction brake for the overdrive ratio and a friction clutch for the locked-up condition of the overdrive gear set, the locked-up condition being required when the transmission is operating in ratios other than overdrive. One solution to this problem is disclosed in copending application Ser. No. 748,626; filed Dec. 8, 1976; of common assignee. This solution involves a two-way roller clutch with a controlled cage and a friction brake for an element of the gear set. A complex piston and hydraulic structure is used to accomplish the interlock which assures that before the brake is applied the cage for the one-way device is controlled.

SUMMARY OF THE INVENTION

The present invention provides a planetary overdrive gear mechanism for use in an automatic transmission which obviates the above-enumerated difficulties and the precise shift-timing difficulties usually encountered. The present invention utilizes a planetary overdrive gear set which has connected within it a one-way clutch mechanism between two elements of the planetary gear set. A unique apparatus is provided which provides a means of immobilizing and centering the cage for the one-way clutch and an interlock of simple construction such that the cage will be neutralized allowing the two elements of the planetary gear set to rotate relative to one another before the disc brake in the unit is applied.

BRIEF DESCRIPTION OF THE DRAWINGS

FIG. 1 is a sectional view of a planetary transmission incorporating an overdrive gear ratio; and
FIG. 2 is a view of the cage control features.

DETAILED DESCRIPTION

Planetary transmission 10 includes a friction brake mechanism 12, a double-acting one-way clutch 14 and a planetary gear set 16. An input shaft 18 is provided connected to the gear set 16 and gear set 16 drives an output shaft 20. Briefly, the operation of the overdrive transmission 10 is that when brake 12 is applied with shaft 18 driving the planetary gear set 16 the shaft 20 driven by planetary gear set 16 will be driven at an increased speed or an overdrive ratio.

Planetary transmission 10 is adapted for use in an automatic transmission wherein it is desired to add an overdrive ratio. In particular it is designed, for example, to replace the overdrive section of the automatic transmission disclosed in application Ser. No. 748,626; filed Dec. 8, 1976; of common assignee. This prior application completely describes the function of the overdrive gear set in cooperation with a three speed automatic transmission and the disclosure of that application Ser. No. 748,266 is incorporated herein by reference. It should be noted that the pres Referring to FIG. 1 provided in a gear casing 22 is a reaction plate 24 and a spacer plate 26 secured in casing 22 by bolts (not illustrated).

The planetry gear set 16 includes a sun gear 32, an annulus gear 34 and a planetary carrier 36 having a plurality of pinion gears 38 rotatably mounted on pins 40 in carrier 36. Pinion gears 38 mesh with sun gear 32 and annulus gear 34. Planetary carrier 36 further includes a radial flange 42 receiving pins 40 on one side of the gear set and a radial flange 44 receiving pins 40 on the other side of the gear set. Flange 42 is formed on input shaft 18. Annulus gear 34 includes a radial driving flange 46 drivingly connected to output shaft 20.

One-way clutch 14 is of the double-acting type particularly described in the above mentioned application of common assignee. One-way clutch 14 has an inner race 50 comprised of a series of cams formed on an axially extending drum 52 integral with sun gear 32. One-way clutch 14 also includes an outer race 54 comprising a smooth cylindrical surface formed on the internal diameter of an annulus member 56 which is secured to flange 44 on carrier 36. One-way clutch 14 further includes a series of rollers or wedging elements 58 carried by a cage member 60 within a series of pockets 62 in the cage member as shown in FIG. 2.

Cage member 60 is adapted to be controlled to provide for proper operation of transmission 10, and there is provided a control flange 64 for this purpose. Control flange 64 includes a series of apertures 68 as shown in FIG. 2. Provided on cage member 60 is a series of tangs 70, each having an angular surface 72. As will be described during operation control flange 64 may be in a position as illustrated in full lines in FIG. 2 in which the cage member 60 is free to rotate or move arcuately in either direction and allow operation of the one-way clutch 14 to provide a driving connection between races 50 and 54 in both directions of relative rotation.

In the position of the control flange 64 illustrated in dotted lines in FIG. 2, tangs 70 are received within apertures 68, the relationship between the tangs 70 and apertures 68 serving to control cage 60 as required. Also, referring to FIG. 2, three relative positions of cage 60 with respect to apertures 68 are indicated, these are "Central", "Drive" and "Coast" positions of the cage indicated by a line representing the upper edge of tangs 70. The "Drive" position is the position the cage will try to assume when the engine is driving the wheels and the gear set is conditioned for overdrive. The "Central" position is the centralized position of the cage in which the rollers do not engage or wedge between the cam surfaces 50 and the race 54. The "Coast" position is the position the cage will tend to move when the vehicle wheels are attempting to drive the engine as when the throttle is released and the gear set is conditioned for overdrive operation.

In the overdrive condition of the control flange 64 illustrated in dotted lines in FIG. 2 wherein cage 60 is shown in the "Central" position, the one-way clutch is to be "neutralized" or in effect conditioned such that it will not interfere with the drive relationship through the gear set 10. If the cage 60 were free to rotate in the clockwise direction (when viewed from the left side of FIG. 1) then the one-way clutch 14 could lock up the gear train 10 making the overdrive set 10 inoperative, and this condition is to be prevented. However, cage 60 can be allowed to go into the opposite direction without any problems since the rollers cannot lock in this direction due to the fact that the rotational speeds of the gear set components of the gear set 10 are such that the race 54 will be rotating faster than the cam surfaces 50 thus preventing the one-way clutch from locking up. Therefore, in the overdrive position of control flange 64 the openings 68 permit movement of the cage 60 in the counterclockwise direction away from the central position toward the drive direction but prevents movement of the cage from the central position in a clockwise direction (as viewed from the left side of FIG. 1) toward the coast position.

The reason for permitting movement of the cage toward the drive position as illustrated in FIG. 2 when the cage is conditioned for overdrive and not allowing it to move to its coast position, is to allow smooth ratio changing from third to fourth and fourth to third ratio during periods when the engine is driving the wheels (power-on). For example, in third when the engine is transferring torque to the wheels the cage will be in its drive position and not central. When the control calls for a shift to overdrive as will be explained later, then the control flange 64 can move to the overdrive position without restriction. As the 3-4 ratio shift takes place sun gear 32 will be held stationary and one-way clutch 14 will overrun, the cage 60 then going to its central position and trying to go on into the coast position. However, the cage is restricted by the control flange 64 from going beyond the central position. On a "power-on" or engine driving the wheels fourth to third ratio change, the sun gear is released allowing the overdrive gear set 10, to be free. However, the cage 60 of one-way clutch 14 can move into the drive position regardless of the position of the control flange 64 and complete the drive and act as a coupling between shaft 18 and shaft 20.

In this manner, "power-on" up and down shifting between third and fourth ratio can be completed by taking over from the one-way clutch and eliminating any ratio changing jerkiness or timing problems.

Now considering the condition where the vehicle is coasting in third ratio that is when the vehicle is for example, going down a grade and the roller clutch has assumed the "Coast" position illustrated in FIG. 2, if the control calls for a third to fourth ratio change and the control flange 64 would stay in the full line position a lock up of the gear set 10 would occur when the brake 12 is engaged to hold sun gear 32 stationary. To prevent this condition the control flange moves into engagement with the tangs 70 on cage 60 and overdrive brake 12 cannot be engaged until the cage 60 moves to its central position as illustrated in FIG. 2. This can be accomplished in either of two ways. Either a torque reversal can occur in which either the control flange quickly moves to its dotted or overdrive position or sufficient force can be placed on the cage by the control flange 64 such that the roller clutch 14 is pulled from engagement and the cage is positioned for overdrive in this manner. Again, the brake 12 must be prevented from being engaged until the cage is in its overdrive positions, either "Central" or "Drive", as illustrated in FIG. 2. As explained above, however, after the cage is engaged by control flange 64 so that it can only be in the "Central" or "Drive" positions, the roller clutch 14 is then conditioned for "power-on" down shifts as explained above.

The additional condition which must be considered is a coast down shift four to three ratio change. In this ratio change the cage 60 will have to mvoe its "Coast" position to provide coupling of shafts in third ratio. When the overdrive brake 12 is released, releasing the sun gear, the control flange 64 can move readily to the full line position of FIG. 2 releasing cage 60 and only minimum force is required.

Provided in plate 24 is a bore 80 in which is received a piston 82. A spring 83 is provided in the bore urging piston 82 to the left. Piston 82 has an arm 84 mounted on a pin 86 integral with piston 82. Arm 84 has a pair of non-metallic annular rings 88 received within flange 90 and secured to arm 84 with an apply plate 92. Apply plate 92 and flange 90 may be secured to arm 84 by welding or other suitable means such as rivets. The arrangment of non-metallic rings 88 allows control flange 64 to rotate within the flange 90.

The rings 88 define a groove therebetween receiving control flange 64. The members 88 are of plastic or other non-metallic material to facilitate rotational movement of plate 64 within the groove.

The friction brake mechanism 12 is comprised of a series of splines 102 formed on an internal diameter of plate 24. Secured to the drum 52 by electron beam welding or other suitable means is a sheet metal brake drum 104 having an axially extending portion 106 thereon, in which are formed a series of driving teeth or splines 108. The drum 104 includes a series of axially extending tangs 110 which are received within apertures in control flange 64. Drivingly connected to drum 104 are a series of friction plates 112. Interspaced between the plates 112 are friction plates 114 which are drivingly connected to the splines 102 on plate 24. A back-up plate 116 is provided connected to splines 102.

The operation of transmission 10 is that when brake 12 is released, the piston 82 being in a position shown in FIG. 1, and the control flange 64 in the position of FIG. 2 cage member 60 is released and drive from the shaft 18 will be transferred directly to shaft 20 at a one-to-one ratio since one-way clutch 14 will be free to drivingly connect sun gear 32 and planetary carrier 36. Transmission 10 is conditioned for overdrive operation, when piston 82 is activated by fluid pressure in bore 80 moving control flange 64 to the phantom line position of FIG. 2, thus controlling cage 60. When piston 82 is moved to the right as viewed in FIG. 1, by fluid pressure in bore 80 on the left side of piston 82, plate 92 will provide a friction engagement of plates 112 and 114 holding drum 104 stationary. With drum 104 stationary holding sun gear 32 stationary, one-way clutch 14 is neutralized, and with carrier 36 being driven by shaft 18, ring gear 34 and shaft 20 will be driven at an increased speed for overdrive ratio with respect to shaft 18. Thus, the gear set 10 will provide either a direct drive or an overdrive ratio, depending upon operation of the control system (not illustrated) controlling actuation of piston 82.

It is to be noted that the mechanism illustrated in FIGS. 1 and 2 provides a unique mechanical interlock between the control of the cage 60 and engagement of friction brake 12. As will be apparent, due to the geometry of the parts, if the piston 82 has not moved to the right to a sufficient extent to restrict cage 60 to its overdrive ("Drive" and "Central") positions, brake 12 cannot be engaged because apply member 92 will not be in engagement with discs 112 and 114. This is essential since if brake 12 can be engaged during the time that cage 60 is released, providing a direct two-way drive between shafts 18 and 20 brake 12 would be attempting to stop rotation of both shafts 18 and 20 which is, of course, improper operation, particularly at the vehicle speeds at which the overdrive transmission 10 is to be actuated to establish overdrive ratio. Further, the above interlock mechanism has the unique advantage that no hydraulic type timing of cage control and engagement of brake 12 is required as shown in the aforementioned copending application.

Although, the embodiment of the invention illustrated in FIG. 1 would involve a series of pistons 82 radially disposed around shafts 18 and 20, it should be apparent that, optionally, one annular piston could be used to actuate an arm or an annular ring 84 to move controller 64.

I claim:

1. A transmission mechanism comprising a planetary gear set having a plurality of relatively rotatable elements, a brake mechanism for one of said elements engagable to hold said element stationary and establish a high-speed drive ratio through said transmission, a roller clutch mechanism mounted between two of said elements, a cage for said roller clutch mechanism, a controller for said cage comprising a plate member engageable with said cage and operative when actuated to hold said cage wherein no direct driving relationship can be established between said two elements in one direction of relative rotation and having a position in which said cage is released whereby a two-way one-to-one drive through said gear set is established by said roller clutch when said cage and said brake are released, a piston for said brake mechanism, and said controller being connected to said piston whereby said brake cannot be engaged until said controller is in a position holding said cage.

2. A transmission mechanism as claimed in claim 1 wherein said plate member has at least one aperture therein and said cage has at least one tang member thereon, the plate member being movable to engage said tank in said aperture to hold said cage.

3. A transmission mechanism as claimed in claim 2 wherein said brake mechanism includes a drum connected to said one element and said drum and said controller being connected.

4. A transmission mechanism as claimed in claim 1 including an input shaft and an output shaft, the planetary gear set elements comprising a ring gear element, a carrier element and a sun gear element, the sun gear element being connected to said brake mechanism, said ring gear element being connected to said output shaft.

5. A transmission mechanism as claimed in claim 1 wherein said piston has a pin thereon connected to said controller and said controller having an apply member thereon adapted to engage said brake whereby said controller is both a cage controller and a brake apply member.

* * * * *